United States Patent
Basson et al.

(10) Patent No.: US 9,306,243 B2
(45) Date of Patent: Apr. 5, 2016

(54) OPTIMIZING BATTERY USAGE

(75) Inventors: Sara H. Basson, White Plains, NY (US); Rick Hamilton, Charlottesville, VA (US); Dimitri Kanevsky, Ossining, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 903 days.

(21) Appl. No.: 13/012,168

(22) Filed: Jan. 24, 2011

(65) Prior Publication Data

US 2012/0189878 A1    Jul. 26, 2012

(51) Int. Cl.
*H01M 10/42*    (2006.01)
*H01M 10/48*    (2006.01)
*H02J 7/00*    (2006.01)
*H01M 10/44*    (2006.01)

(52) U.S. Cl.
CPC .............. *H01M 10/42* (2013.01); *H01M 10/44* (2013.01); *H01M 10/48* (2013.01); *H02J 7/0021* (2013.01)

(58) Field of Classification Search
CPC ......... H02J 7/00; H02J 7/0003; H02J 7/0004; H02J 7/0006; H02J 7/0008; H02J 7/0009; H02J 7/0011; H02J 7/0013; H02J 7/0021; H02J 7/0024; H01M 10/42; H01M 10/4207; H01M 10/4221; H01M 10/4285; H01M 10/44; H01M 10/443; H01M 10/446; H01M 10/448; H01M 10/48; H01M 10/482; H01M 10/486; H01M 10/488

USPC ................................. 429/50, 61, 90; 320/134
See application file for complete search history.

(56) References Cited

U.S. PATENT DOCUMENTS

| | | | | |
|---|---|---|---|---|
| 5,256,954 A | * | 10/1993 | Chen | 320/110 |
| 5,365,159 A | * | 11/1994 | Chen | 320/113 |
| 5,711,648 A | | 1/1998 | Hammerslag | |
| 6,049,210 A | | 4/2000 | Hwang | |
| 6,094,028 A | * | 7/2000 | Gu et al. | 320/109 |
| 6,271,646 B1 | | 8/2001 | Evers et al. | |
| 6,331,761 B1 | * | 12/2001 | Kumar et al. | 320/132 |
| 6,456,037 B1 | | 9/2002 | Jakl et al. | |
| 6,756,768 B2 | | 6/2004 | Okada | |
| 6,914,412 B2 | * | 7/2005 | Wang et al. | 320/103 |
| 6,914,415 B2 | | 7/2005 | Bohne et al. | |
| 7,274,168 B2 | * | 9/2007 | Tsukamoto et al. | 320/106 |

(Continued)

FOREIGN PATENT DOCUMENTS

| EP | 0965906 | 12/1999 |
|---|---|---|
| JP | 2000331718 | 11/2000 |

OTHER PUBLICATIONS

Dougal et al. "Soldier System Power Sources," Final Project Report Contract # N00014-03-1-0952, Dec. 31, 2006.

(Continued)

*Primary Examiner* — Milton I Cano
*Assistant Examiner* — Michael Dignan
(74) *Attorney, Agent, or Firm* — Ryan, Mason & Lewis, LLP

(57) ABSTRACT

Techniques for optimizing battery usage are provided. The techniques include sensing energy level of a battery, comparing the sensed energy level of the battery to a predetermined energy threshold for the battery, and controlling energy flow to and from the battery based on the comparison of the sensed energy level and the energy threshold.

8 Claims, 4 Drawing Sheets

(56) References Cited

U.S. PATENT DOCUMENTS

| | | | |
|---|---|---|---|
| 7,446,502 B2 * | 11/2008 | Tong | 320/110 |
| 7,547,329 B1 * | 6/2009 | Richardson | 29/623.5 |
| 7,605,568 B2 | 10/2009 | Gangstoe et al. | |
| 8,154,244 B1 * | 4/2012 | Gorham et al. | 320/103 |
| 2004/0121223 A1 | 6/2004 | Kim | |
| 2007/0108946 A1 * | 5/2007 | Yamauchi et al. | 320/132 |
| 2007/0216355 A1 | 9/2007 | Kim | |
| 2007/0273326 A1 | 11/2007 | Krieger et al. | |
| 2008/0042619 A1 | 2/2008 | Li | |
| 2008/0129253 A1 | 6/2008 | Shiue et al. | |
| 2008/0238356 A1 | 10/2008 | Batson et al. | |
| 2009/0096399 A1 | 4/2009 | Chen et al. | |
| 2009/0261784 A1 | 10/2009 | MacNair, Jr. et al. | |
| 2010/0134305 A1 | 6/2010 | Lu et al. | |
| 2010/0277122 A1 * | 11/2010 | Yang | 320/110 |
| 2011/0007491 A1 | 1/2011 | Robinson et al. | |
| 2012/0151240 A1 * | 6/2012 | Robinson et al. | 713/340 |

OTHER PUBLICATIONS

IPCOM000184809D: "Application Specific Battery Storage Exit Capacity Calculator," IBM, Jun. 30, 2009.

Battery (electricity), Environmental Concerns. http://en.wikipedia.org/wiki/Battery_(electricity)#Environmental_concerns.

How to prolong lithium-based batteries. Battery University. http://batteryuniversity.com/learn/article/how_to_prolong_lithium_based_batteries.

Storage battery. http://www.answers.com/topic/battery-electricity.

Hayles, Peter. Intelligent NiCd/NiMH Battery Charger—Construction Project. http://www.angelfire.com/electronic/hayles/charge1.html.

Wikipedia, Battery (electricity), Environmental Concerns, https://en.wikipedia.org/w/index.php?title=Battery_(electricity)&oldid=409612848, Jan. 23, 2011.

Battery University, How to prolong lithium-based batteries, http://batteryuniversity.com/learn/article/how_to_prolong_lithium_based_batteries, Jan. 11, 2011.

Storage battery. http://www.answers.com/topic/battery-electricity, Aug. 28, 2010.

Hayles, Peter. Intelligent NiCd/NiMH Battery Charger—Construction Project. http://www.angelfire.com/electronic/hayles/charge1.html, Apr. 9, 2010.

* cited by examiner

OPTIMIZING BATTERY USAGE

FIELD OF THE INVENTION

Embodiments of the invention generally relate to information technology, and, more particularly, to battery usage.

BACKGROUND OF THE INVENTION

The environmental damage associated with inappropriate discard practices with respect to batteries is well documented, and yet large volumes of batteries continue to be disposed of inappropriately. Proper disposal prevents dangerous elements (such as, for example, lead, mercury, and cadmium) found in some types of batteries from entering the environment.

Rechargeable batteries have the potential to reduce the frequency of inappropriate battery disposal, because they will be discarded less frequently. However, the prevalence of non-rechargeable batteries remains.

Additionally, disposable batteries wane and lose charge with increased usage. Therefore, battery users may often discard such batteries before they have fully discharged, in order to avoid the risk of batteries dying suddenly in the midst of usage. Consequently, batteries may frequently have power remaining at the time that they are discarded, and such power is thereby potentially wasted upon disposal.

SUMMARY OF THE INVENTION

Principles and embodiments of the invention provide techniques for optimizing battery usage. An exemplary method (which may be computer-implemented) for optimizing battery usage, according to one aspect of the invention, can include steps of sensing energy level of a battery, comparing the sensed energy level of the battery to a predetermined energy threshold for the battery, and controlling energy flow to and from the battery based on the comparison of the sensed energy level and the energy threshold.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
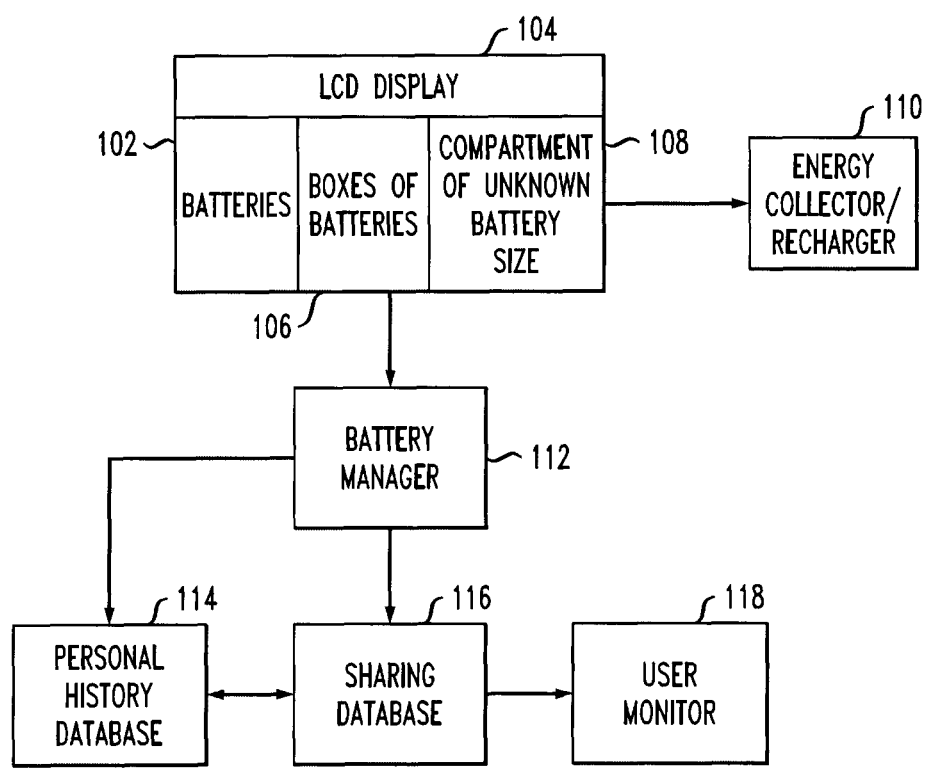
FIG. 1 is a diagram illustrating architecture for greener battery usage, according to an embodiment of the present invention.

Principles of the invention include greener battery usage. One or more embodiments of the invention include recovering remaining or residual energy stored in the battery, or draining the remaining or residual energy for reuse. Additionally, one or more embodiments of the invention include determining if a rechargeable battery can be recharged or if the remaining energy can be recovered for reuse, as well as dynamically adjusting battery recharge energy flow to optimize battery life.

As detailed herein, a battery can be inserted into a charge-optimizing device. In one or more embodiments of the invention, the charge-optimizing device can be dedicated, for example, "battery handler" or it can be software/hardware embedded in other multi-function units (for example, in the device (for example, a camera) itself).

One or more embodiments of the invention can additionally include assembling multiple batteries together in a compartment to reuse remaining energy from all or the batteries (scalability), which can allow for assembly of different types and configurations of batteries. A battery can be manually or automatically set to charge optimization. Manual setting can indicate that a user specifies that the function (for example, charge to be depleted or charge to be optimized) be accomplished. Automatically setting to charge optimization can indicate, for example, that the function is accomplished upon detection of certain conditions, such as current battery voltage level.

Also, battery type can be manually or automatically determined. A manual setting can indicate, for example, that a user selects non-renewable or renewable. An automatic setting can indicate that, for example, battery type can be detected by embedded query logic (the battery identifies itself), through, for instance, visual recognition (pattern matching for the battery casing), or through other means.

One or more embodiments of the invention can additionally include a personal history database of batteries, which can be used to learn lifetimes of batteries as well as charging/discharging history to learn about battery life over time. Sharing a database, for example, on the internet, can allow different users to share their databases with others. As such, one or more embodiments of the invention include storing information from a personal history database directly onto a shared website database. Further, a user monitor allows a user to have a visual representation of what is happening in a box (that is, a visual representation of a system where batteries are held) showing the energy status of each battery in a given compartment.

Accordingly, as described herein, one or more embodiments of the invention include techniques for charging and discharging batteries, designed to optimize battery life while recapturing otherwise-wasted power. One or more embodiments of the invention can include performing two related functions. Firstly, for single use devices, the techniques detailed herein include draining any remaining charge from a battery and storing that remaining charge in a separate device for later reuse. Secondly, the techniques described herein include, for rechargeable devices, detecting the nature of a battery, and draining it to an optimal level before recharging, so as to better condition the battery for longer life.

As noted herein, one or more embodiments of the invention can be performed manually or automatically. Automatic performance encompasses the detection of battery type (via, for example, visual, size, weight, current and voltage (I/V) diagram) and charging state before the function is accomplished.

If a battery is renewable, one or ore embodiments of the invention can include using a look-up table to determine an optimal charge/discharge pattern for maximal battery life, and further proceeding to appropriate recharge patterns. For example, for lithium-ion, battery life can be optimized by discharging to some optimal level (for example, discharge to 30%) for storage in a collection device for later use. The renewable battery is then recharged according to patterns designed to maximize battery life.

As further described herein, one or more embodiments of the invention includes a device that includes a module for inserting batteries for energy distribution, sensors for reading batteries' energy levels, a detachable energy box, and a battery manager to control energy flow between batteries and detachable box. Additionally, one or more embodiments of the invention can also include a temperature control module.

FIG. 1 is a diagram illustrating architecture for greener battery usage, according to an embodiment of the present invention. By way of illustration, FIG. 1 depicts a component 102 containing batteries with different compartments, including a compartment 106 having batteries of a specific type and known size, and a compartment 108 for unknown battery size. Component 102 also includes a liquid crystal display (LCD) 104 that contains information about the batteries.

FIG. 1 also depicts a component 110 with energy collected from the batteries in component 102 that can be detached from component 102 and connected to other energy sources. Additionally, a battery manager module 112 reads information about energy levels of the batteries in component 102 and controls a time of when and how long energy is taken from batteries in component 102. The battery manager module includes sensors that provide information as to how much energy is left in each battery in component 102. The battery manager module also includes a table or set of rules that facilitate prediction of how long the combination of remaining amounts of energy in all batteries (in component 102) is sufficient to provide required support (that is, is above some threshold).

Further, as depicted in FIG. 1, a personal history database 114 of batteries can be used to determine (and store) information pertaining to the lifetimes of batteries, as well as batteries' charging/discharging history to learn about battery life over time.

Also, FIG. 1 depicts a sharing database 116, which can be shared, for example, on the internet, which allows different users to share their "personal history database" with others. This can facilitate many users to learn better strategies to optimize battery life, and can be carried out automatically by storing information from a personal history database directly onto a shared website database. Further, FIG. 1 depicts a user monitor 118, which allows user to have a visual representation of what is happening in component 102, showing, for example, the energy status of each battery in compartment.

Figure 2A:
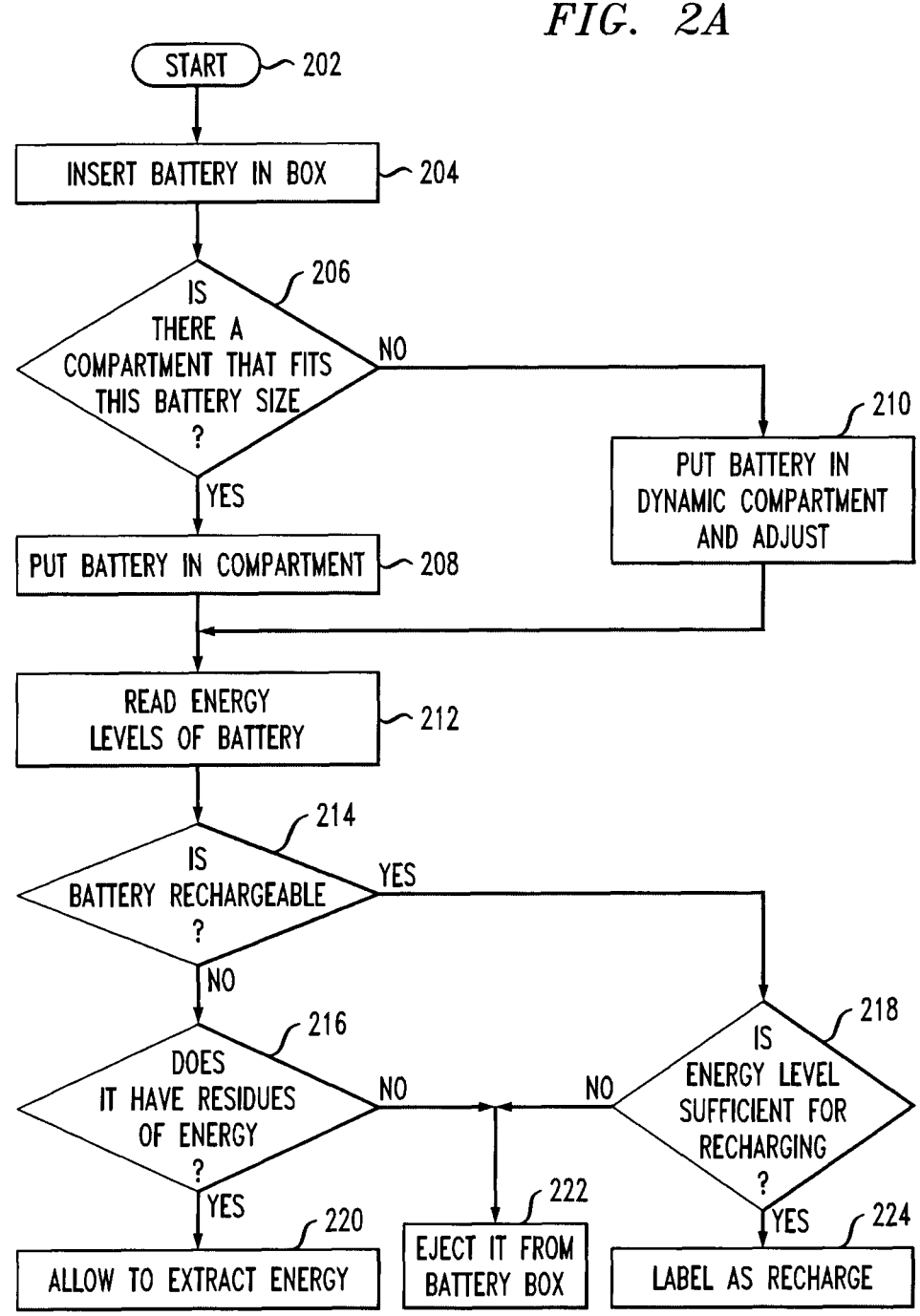
FIG. 2A is a flow diagram illustrating techniques for greener battery usage, according to an embodiment of the invention.
Figure 2B:
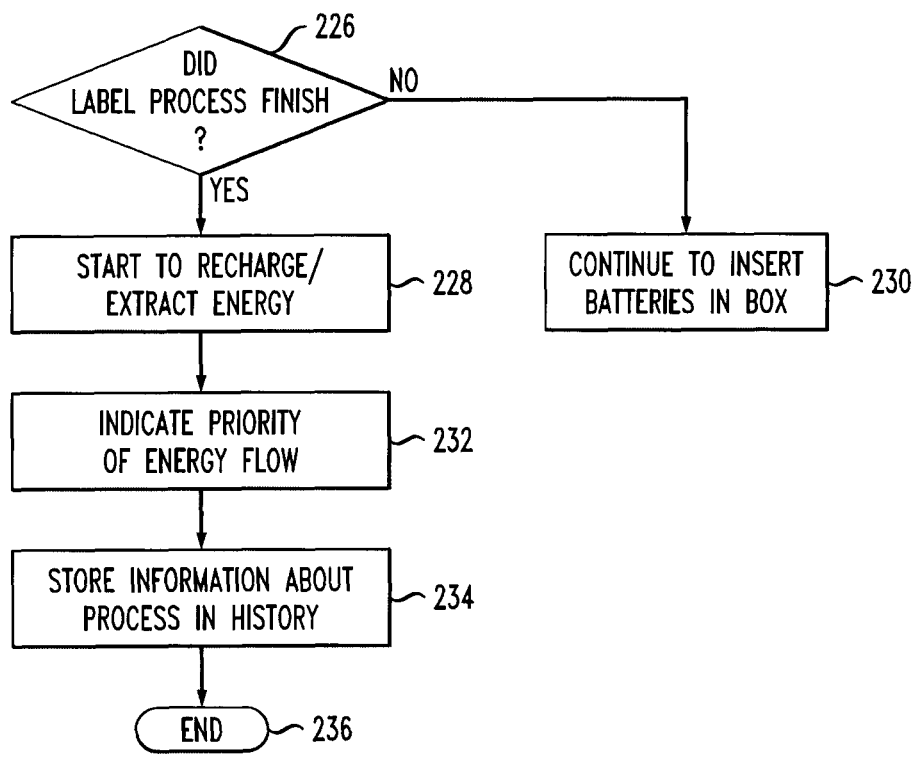
FIG. 2B is a flow diagram illustrating techniques for greener battery usage, according to an embodiment of the invention.

FIG. 2A and FIG. 2B are flow diagrams illustrating techniques for greener battery usage, according to an embodiment of the present invention. By way of illustration, in FIG. 2A, the techniques begin in step 202. Step 204 includes inserting battery into a component (such as component 102 in FIG. 1). Step 206 includes determining if there is a compartment (within the component) that fits the battery size in question. If there is a fit, the techniques can proceed to step 208, which includes putting the battery into an appropriate compartment. If the battery size will not fit into any compartment, the techniques proceed to step 210, which includes putting the battery into a dynamic compartment of the component and making any necessary adjustments.

Step 212 includes reading an energy level of the inserted batteries (within the component). Additionally, step 214 includes determining if a battery is re-chargeable. If a battery is not re-chargeable, the techniques (with respect to that battery) proceed to step 216. If a battery is re-chargeable, the techniques (with respect to that battery) proceed to step 218. As such, step 216 includes determining if the battery has residues of energy. If the battery does not have residues of energy, the techniques proceed to step 222, which includes ejecting the battery from the component (such as, for example, component 102 in FIG. 1). If yes, the techniques proceed to step 220, which includes marking that item as "allow to extract energy."

Further, step 218 includes determining if the energy level in the battery is sufficient to recharge the battery. If the energy level in the battery is sufficient, the techniques proceed to step 224, which includes labeling the item as "recharge," and allowing it to recharge. If the energy level in the battery is not sufficient, the techniques proceed to step 222.

Additionally, in FIG. 2B, step 226 includes determining if the label process has finished. If yes, the techniques proceed to step 228, which includes starting to recharge or extract energy. If the label process has not finished, the techniques proceed to step 230, which includes continuing to insert new batteries into the battery component.

Step 232 includes indicating priorities of energy flow for rechargeable batteries as well as detachable energy blocks. By way of example, priorities can be defined by various criteria such as, for instance, what batteries can be damaged if they do not enough have energy left, or which batteries have enough energy above a certain threshold after which they can be damaged. The priorities are defined by the battery manager module. Also, step 234 includes printing or displaying information about a battery process into a personal history database (for example, to be shared with other users). Step 236 includes finishing the techniques.

Figure 3:
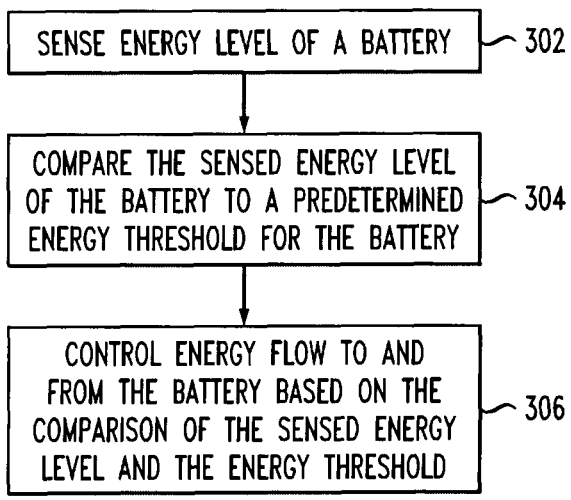
FIG. 3 is a flow diagram illustrating techniques for optimizing battery usage, according to an embodiment of the invention.

FIG. 3 is a flow diagram illustrating techniques for optimizing battery usage, according to an embodiment of the present invention. Step 302 includes sensing energy level of a battery. This step can be carried out, for example, using a sensor module. Step 304 includes comparing the sensed energy level of the battery to a predetermined energy threshold for the battery. This step can be carried out, for example, using a battery manager module.

Step 306 includes controlling energy flow to and from the battery based on the comparison of the sensed energy level and the energy threshold. This step can be carried out, for example, using a battery manager module and/or a detachable energy redistribution module. Controlling energy flow to and from the battery can include, for example, sending additional energy to the battery when the sensed energy level has a predetermined relationship to the energy threshold calling for additional energy to be sent to the battery. Additionally, controlling energy flow to and from the battery can include draining energy from the battery when the sensed energy level has a predetermined relationship to the energy threshold calling for energy to be extracted from the battery.

Also, controlling energy flow to and from the battery can be performed manually or automatically. A manual setting facilitates user specification that a particular function (for example, charge to be depleted or charge to be re-charged) be accomplished. An automatic setting facilitates that a particular function is accomplished upon detection of one or more conditions (such as, for example, current battery voltage level).

The techniques depicted in FIG. 3 can also include determining a battery type for the battery, wherein battery type includes one of re-chargeable and not re-chargeable. Determining a battery type for the battery can include manually determining a battery type for the battery and/or automatically determining a battery type for the battery. An automatic setting for determining a battery type for the battery can include using embedded query logic (the battery identifies itself), visual recognition (pattern matching for the battery casing), etc.

As described herein, one or more embodiments of the invention also include determining if a battery has residues of energy if the battery is not re-chargeable, and ejecting the battery for resumption of use or marking the battery for energy extraction if the battery has residues of energy. Such actions can depend, for example, on the amount of energy residues remaining in a non re-chargeable battery. For example, if the battery has a significant amount of energy left, the system may simply eject the battery for resumption of use (of that significant amount of remaining energy). The techniques depicted in FIG. 3 also include determining if the energy level of the battery is sufficient to recharge the battery if the battery is re-chargeable (for example, via using a look-up table to determine an optimal charge/discharge pattern for maximal battery life, and further proceeding to appropriate recharge patterns), and marking the battery for a recharge if the energy level in the battery is sufficient to recharge the battery.

Further, the techniques depicted in FIG. 3 can also include inputting information pertaining to a battery charge process into a personal history database.

The techniques depicted in FIG. 3 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a sensor module, a detachable energy redistribution module, a battery manager module, a temperature control module, a personal history database, a sharing database and a display component that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

One or more embodiments of the invention also include an apparatus for battery usage optimization, wherein the apparatus includes a compartment to house one or more batteries (for example, component 102 in FIG. 1), a detachable energy redistribution module (for example, component 110 in FIG. 1), and a battery manager module (for example, component 112 in FIG. 1) to control energy flow between a battery in the compartment and the detachable energy module, wherein the battery manager module comprises one or more sensors for reading one or more battery energy levels, and wherein the battery manager module further includes a component for comparing the one or more battery energy levels to a predetermined energy threshold for each battery and controlling energy flow to and from each battery based on the comparison of the read energy level and the energy threshold. Such an apparatus, in one or more embodiments of the invention, can additionally include a personal history database (for example, component 114 in FIG. 1), a sharing database (for example, component 116 in FIG. 1), as well as a display component (for example, component 104 in FIG. 1). Additionally, in one or more embodiments of the invention, the battery manager module can include one or more temperature sensors. Temperature sensors facilitate the removal of batteries and control energy flow depending on the temperature of the batteries. For example, some batteries, especially ones that are damaged, become overheated during energy flow and should be ejected).

In one or more embodiments of the invention, in such an apparatus, the compartment to house one or more batteries can be dynamically adjusted to one or more battery sizes. Further, the detachable energy redistribution module can be connected to one or more additional energy sources. Additionally, the battery manager module, in controlling energy flow between a battery in the compartment and the detachable energy module, is operative to send additional energy to the battery from the energy redistribution module when a sensed energy level of the battery has a predetermined relationship to an energy threshold calling for additional energy to be sent to the battery, and also operative to extract energy from the battery when a sensed energy level of the battery has a predetermined relationship to an energy threshold calling for energy to be extracted from the battery.

Additionally, the techniques depicted in FIG. 3 (and described elsewhere herein) can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
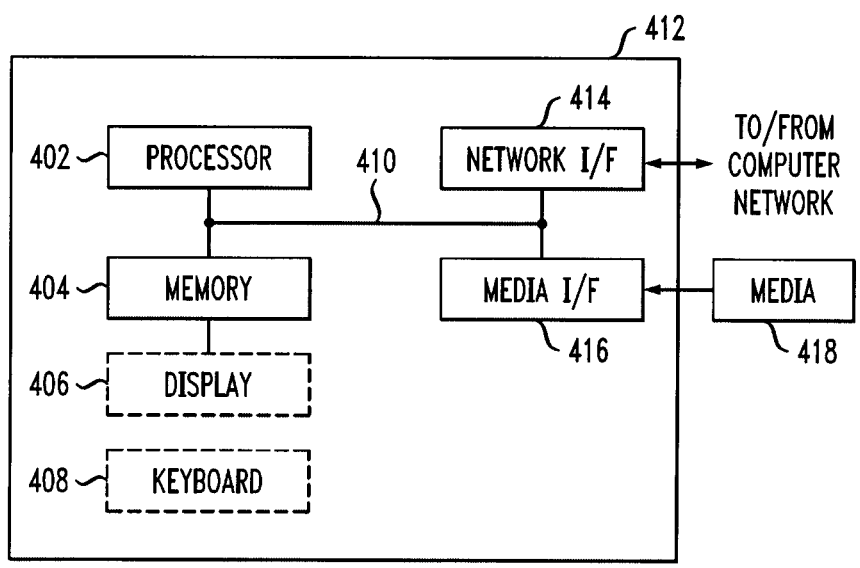
FIG. 4 is a system diagram of an exemplary computer system on which at least one embodiment of the invention can be implemented.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on one or more hardware processors 402. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, determining if a rechargeable battery can be recharged or if the remaining energy can be recovered for reuse, as well as dynamically adjusting battery recharge energy flow to optimize battery life.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for optimizing battery usage, wherein the method comprises:

automatically sensing an energy level of each battery among a set of multiple variable batteries that are housed in a device, wherein the device comprises multiple compartments of a size that can be dynamically adjusted in real-time from a first size to a second size to fit a respective one of the multiple variable batteries that does not fit within the first size;

automatically comparing the sensed energy level of each battery among the set of batteries to at least one predetermined energy threshold exclusively pertaining to the energy level of each battery among the set of batteries;

automatically marking each battery among the set of batteries as permitted for recharging if the sensed energy level of the given battery is sufficient to recharge the given battery based on said comparing;

automatically marking each battery among the set of batteries as permitted for energy extraction if the sensed energy level in the given battery is sufficient to extract energy from the given battery based on said comparing;

monitoring the temperature of each battery among the set of batteries via one or more temperature sensors;

automatically determining a battery type for each battery among the set of batteries, wherein battery type comprises one of rechargeable and not rechargeable, and wherein automatically determining the battery type for each battery among the set of batteries comprises pattern matching a battery casing for each battery among the set of batteries against a battery casing for one or more known battery types; and automatically controlling energy flow to and from each battery among the set of batteries based on (i) the temperature of each battery among the set of batteries, (ii) the determined battery type for each battery among the set of batteries, and (iii) the comparison of the sensed energy level and the at least one energy threshold exclusively pertaining to the energy level of each battery among the set of batteries, wherein said controlling comprises:

extracting any remaining charge from each battery among the set of batteries marked for energy extraction and storing the remaining charge in the device if (i) the given battery is not rechargeable and (ii) the sensed energy level has a given predetermined relationship to the at least one energy threshold calling for energy to be extracted from the given battery; and extracting an amount of charge from each battery among the set of batteries marked for energy extraction to render the given battery as containing a given amount of charge for recharging if (i) the given battery is rechargeable and (ii) the sensed energy level has a given predetermined relationship to the at least one energy threshold calling for energy to be extracted from the given battery; and recharging, using charge stored in the device, each battery among the set of batteries marked for recharging that (i) is rechargeable and (ii) has had charge extracted to render the given battery as containing the given amount of charge for recharging.

2. The method of claim 1, wherein a manual setting facilitates user specification that a particular function be accomplished.

3. The method of claim 1, wherein an automatic setting facilitates that a particular function is accomplished upon detection of one or more conditions.

4. The method of claim 1, further comprising determining if each battery among the set of batteries has residues of energy if the given battery is not rechargeable.

5. The method of claim 4, further comprising ejecting each battery among the set of batteries for resumption of use.

6. The method of claim 1, further comprising determining if the energy level of each battery among the set of batteries is sufficient to recharge the given battery if the given battery is rechargeable.

7. The method of claim 1, further comprising inputting information pertaining to a battery charge process into a personal history database.

8. The method of claim 1, further comprising providing a system, wherein the system comprises one or more distinct software modules, each of the one or more distinct software modules being embodied on a tangible computer-readable recordable storage medium, and wherein the one or more distinct software modules comprise a sensor module, a detachable energy redistribution module and a battery manager module executing on a hardware processor.

* * * * *